E. W. PELL.
SIGNALING APPARATUS.
APPLICATION FILED JULY 11, 1916.

1,252,163.

Patented Jan. 1, 1918.
2 SHEETS—SHEET 1.

Inventor
E. W. Pell,
By Victor J. Evans
Attorney

Witness
C. F. Rudolph

E. W. PELL.
SIGNALING APPARATUS.
APPLICATION FILED JULY 11, 1916.

1,252,163.

Patented Jan. 1, 1918.
2 SHEETS—SHEET 2.

Inventor
E. W. Pell,
By Victor J. Evans
Attorney

Witnesses
C. F. Rudolph

UNITED STATES PATENT OFFICE.

EARL W. PELL, OF CLEVELAND, OHIO.

SIGNALING APPARATUS.

1,252,163.   Specification of Letters Patent.   Patented Jan. 1, 1918.

Application filed July 11, 1916. Serial No. 108,669.

*To all whom it may concern:*

Be it known that I, EARL W. PELL, a citizen of the United States, residing at Cleveland, in the county of Cuyahoga and State of Ohio, have invented new and useful Improvements in Signaling Apparatus, of which the following is a specification.

This invention relates to a signaling apparatus for vehicles and has for its primary object to simplify the construction of the various parts and to so arrange the different elements that the signal devices will be automatically operated in the control of the vehicle.

An object of the invention is the novel manner of supporting a casing and a license plate at the rear of the vehicle with the minimum number of parts.

With these and other objects in view the invention will be better understood from the following detailed description taken in connection with the accompanying drawings, wherein, Figure 1 is a rear elevation of a vehicle showing my invention applied thereto.

Figure 1:
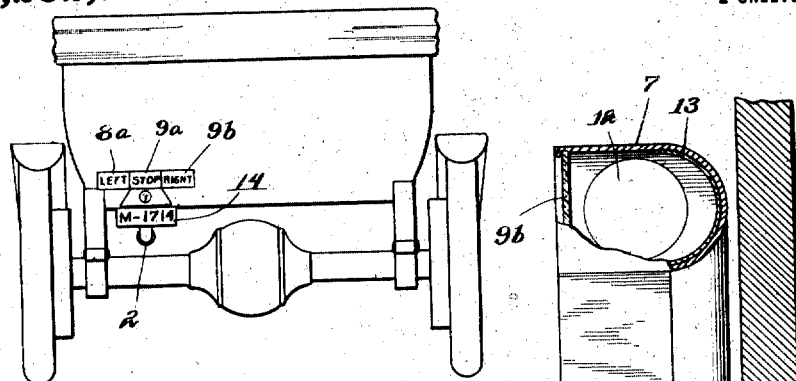
Figure 2:
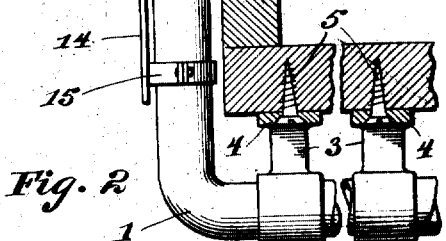
Fig. 2 is a longitudinal sectional view through a portion of the vehicle showing my apparatus in side elevation.
Figure 3:
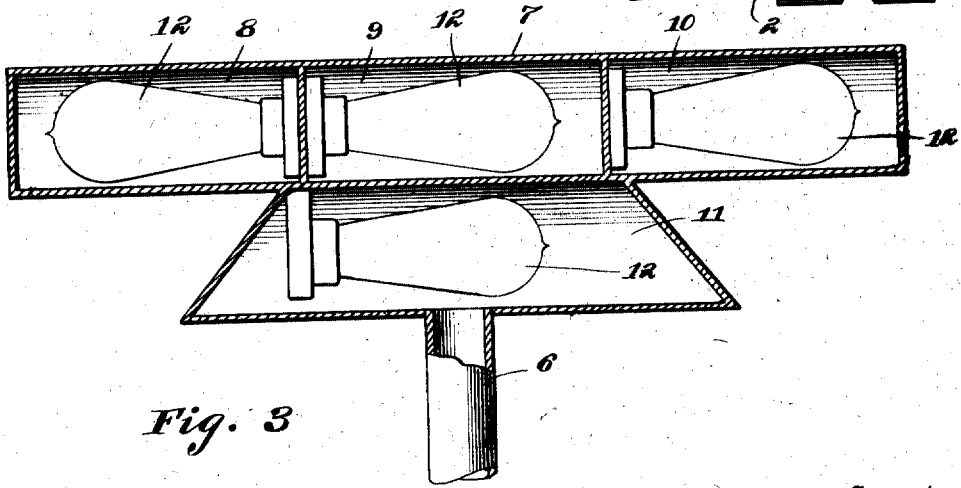
Fig. 3 is an enlarged vertical sectional view of the apparatus.
Figure 4:
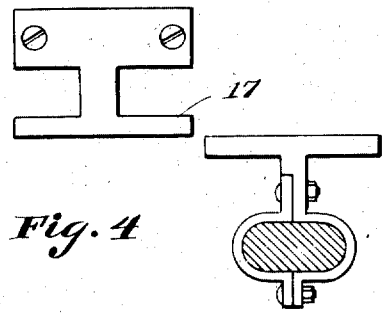
Figs. 4 and 5 are detailed views of the switches.
Figure 5:
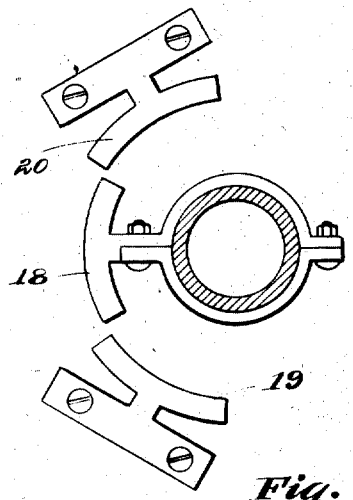
Figure 6:
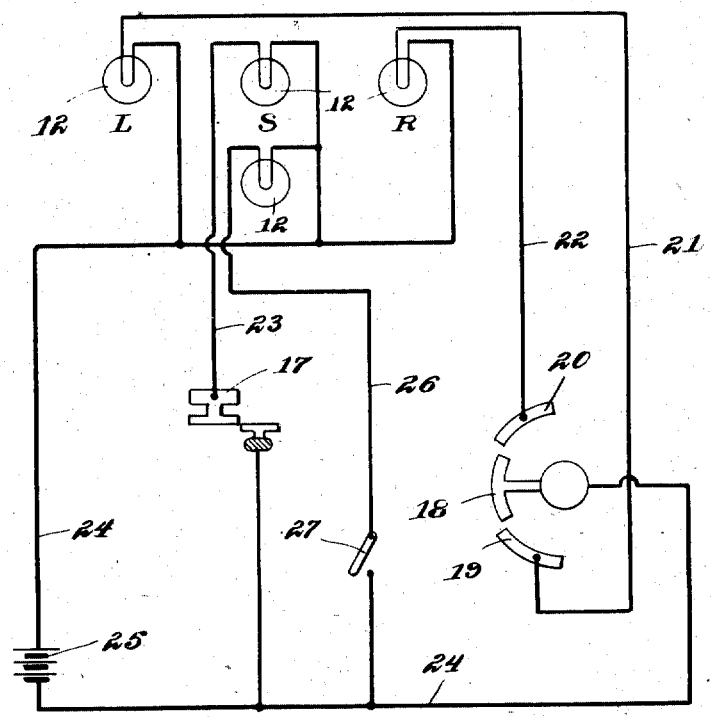
Fig. 6 is a diagrammatic view of the wiring.

Referring to the drawings the numeral 1 designates a substantially L shaped tube, the horizontal limb 2 of which being secured to the body of the vehicle by means of hangers 3, each provided with a flange 4 through which passes screws 5 directly engaging the body of the vehicle. The vertical limb 6 has its end portion rigidly secured to a casing 7 formed to have three horizontally alined compartments 8, 9 and 10, and a fourth compartment 11 arranged below the compartment 9.

Closing the front of the compartment 8 is a glass plate 8ª having printed thereon the word "Left", while closing the front walls of the compartments 9 and 10 respectively are glass plates 9ª and 9ᵇ carrying the words "Stop" and "Right". Arranged in each compartment is an electric bulb 12 the light rays from which are acted upon by reflectors 13. Arranged directly below the compartment 11 so as to be acted upon by the rays from the lamp therein is a license plate 14 carrying clamps 15 that encircle the limb 6.

Clamped to the clutch lever of the vehicle is a contact plate 17 held stationary upon the body of the vehicle, and which coöperates with a stationary contact 16 to open and close a circuit by the movement of said clutch lever as hereinafter described. An arcuate shaped contact 18 is clamped to the steering rod of the vehicle and coöperates with two spaced stationary arcuate shaped contact plates 19 and 20 to open and close circuits hereinafter described. The electric bulb arranged in the "left" compartment has one terminal connected to a conductor 21 that has its other terminal connected to the contact plate 19, while the lamp in the compartment "right" is similarly connected to a conductor 22 that is terminally connected to the contact plate 20, the other terminal of said lamp being connected to a conductor 24 which includes a source of current 25 in series therewith. The bulb 12 in the compartment "stop" has one terminal connected by means of a conductor 23 to the contact plate 17, the other terminal of lamp 12 in the "stop" compartment is connected to the conductor 24. The conductor 24 on the other side of the source of current 25 is connected to contact 18 and 16. The lamp 12 in the compartment 11 is arranged in series with a conductor 26 having its terminal connected to the conductor 24 to opposite sides of the source of current 25 and the continuity of this conductor 26 is controlled by a switch 27.

From the foregoing description taken in connection with the accompanying drawings it will be seen that upon actuation of the clutch lever or steering rod of the vehicle, the different circuits will be automatically closed for illuminating certain of the lamps, that is to say, when the clutch lever is thrown to an inoperative position, the lamp in the compartment "stop" will be illuminated, whereas upon rotation of the steering rod of the vehicle in either direction from its normal, the lamps in either of the compartments "left" and "right" will be illuminated.

It should be apparent from the foregoing subject matter that I provide an apparatus which is admirably adapted for the purpose for which it is intended, that the apparatus is simple, durable and efficient of construction and may be manufactured and sold at a comparatively low cost.

What I claim is:—

In a device of the character described, a signal comprising an L-shaped cylindrical tubular supporting member disposed in a vertical position at the rear of a vehicle, the short arm of the member being disposed beneath the vehicle body, hangers in encircling engagement with said short arm and secured to the underside of the vehicle body, a casing secured upon the upper end of the long arm of said supporting member, the upper portion of said casing being semi-circular in cross-section and divided into three horizontally alining compartments, the lower portion of said casing comprising a single compartment having its ends outwardly inclined and terminating short of the ends of said upper portion, and transparent plates covering said compartments, the three upper plates bearing legends, said tubular member further serving as a support for a license plate and as a conduit for wires leading to incandescent lamps disposed within said compartments.

In testimony whereof I affix my signature.

EARL W. PELL.